US 6,705,947 B1

United States Patent
Hildebrandt et al.

(10) Patent No.: US 6,705,947 B1
(45) Date of Patent: Mar. 16, 2004

(54) CONSTANT VELOCITY BALL-AND-GROVE JOINT

(75) Inventors: Wolfgang Hildebrandt, Siegburg (DE); Anna Gemmelmaier, Sankt Augustin (DE)

(73) Assignee: GKN Automotive GmbH, Lohmar (DE)

( * ) Notice: Subject to any disclaimer, the term of this patent is extended or adjusted under 35 U.S.C. 154(b) by 68 days.

(21) Appl. No.: 10/069,818
(22) PCT Filed: Aug. 23, 2000
(86) PCT No.: PCT/EP00/08229
§ 371 (c)(1), (2), (4) Date: Jul. 9, 2002
(87) PCT Pub. No.: WO01/16500
PCT Pub. Date: Mar. 8, 2001

(30) Foreign Application Priority Data

Aug. 30, 1999 (DE) .......................... 199 41 142

(51) Int. Cl.[7] .......................... F16D 3/224; F16D 3/223
(52) U.S. Cl. .......................... 464/145; 464/906
(58) Field of Search .......................... 464/145, 906, 464/144, 146

(56) References Cited

U.S. PATENT DOCUMENTS

| | | | | |
|---|---|---|---|---|
| 3,520,152 A | * | 7/1970 | Schmid | 464/145 |
| 3,553,979 A | * | 1/1971 | Noguchi et al. | 464/145 |
| 3,789,624 A | * | 2/1974 | Camosso | 464/145 |
| 4,968,287 A | * | 11/1990 | Jacob | 464/145 |
| 5,230,659 A | * | 7/1993 | Bird et al. | 464/143 |
| 5,288,273 A | * | 2/1994 | Krude | 464/145 |

FOREIGN PATENT DOCUMENTS

| | | |
|---|---|---|
| DE | 24 33 349 C2 | 2/1976 |
| DE | 39 39 531 C1 | 6/1991 |
| DE | 44 43 093 C1 | 1/1996 |
| DE | 196 33 216 C1 | 1/1998 |
| EP | 0 794 346 A1 | 9/1997 |
| GB | 810 289 | 3/1959 |
| GB | 2 331 570 A | 5/1999 |

OTHER PUBLICATIONS

Schmelz, F., et al; Gelenke Und Gelenkwellen; 1988.

* cited by examiner

Primary Examiner—Lynne H. Browne
Assistant Examiner—Kenn Thompson (57) ABSTRACT

A constant velocity universal ball joint comprising an outer joint part having a first axis and comprising an inner aperture in which there are provided substantially longitudinally extending first ball tracks, an inner joint part having a second axis and forming a ball hub positioned in the inner aperture of the outer joint part and being provided with substantially longitudinally extending second ball tracks, torque transmitting balls guided in first and second ball tracks associated with one another in pairs, and an annular ball cage which is arranged between the outer joint part and inner joint part and comprises circumferential distributed ball windows in which the individual balls are held in a common plane and guided on to the angle-bisecting plane between the first axis and the second axis, wherein at least the ball tracks of one of the joint parts—outer joint part or inner joint part—comprise a track cross-section which remains uniform along the length of same, whose second derivative rises continuously and monotonically from the track base, whose radius of curvature is not constant and which, when the joint is torque-free, permits a contact between the respective ball and the track base within a range of $\leq 5°$ measured from the track base.

20 Claims, 10 Drawing Sheets

| Proposal | Ellipse radius A | Ellipse radius B | A/Rball | B/Rball | A/B |
|---|---|---|---|---|---|
| 1 | 8.1284 | 8.0421 | 1.0241 | 1.0132 | 1.0107 |
| 2 | 8.0496 | 8.0165 | 1.0141 | 1.0100 | 1.0041 |
| 3 | 8.1375 | 8.0472 | 1.0252 | 1.0138 | 1.0112 |
| 5 | 8.1587 | 8.0594 | 1.0279 | 1.0154 | 1.0123 |
| 6 | 8.1512 | 8.0502 | 1.0269 | 1.0142 | 1.0125 |
| 9 | 8.1504 | 8.0438 | 1.0268 | 1.0134 | 1.0133 |
| 39°/1.04 | 8.6205 | 8.1913 | 1.0860 | 1.0320 | 1.0524 |
| 45°/1.04 | 8.4320 | 8.1012 | 1.0623 | 1.0206 | 1.0408 |

CONSTANT VELOCITY BALL-AND-GROVE JOINT

BACKGROUND OF THE INVENTION

The invention relates to a constant velocity universal ball joint comprising an outer joint part having a first axis and comprising an inner aperture in which there are provided substantially longitudinally extending first ball tracks, an inner joint part having a second axis and forming a ball hub positioned in the inner aperture of the outer joint part and being provided with substantially longitudinally extending second ball tracks, torque transmitting balls guided in first and second ball tracks associated with one another in pairs, and an annular ball cage which is arranged between the outer joint part and inner joint part and comprises circumferentially distributed ball windows in which the individual balls are held in a common plane and guided on to the angle-bisecting plane between the first axis and the second axis.

It is known that the torque-related pressure conditions in the ball tracks and thus the service life of joints of the above type can be influenced by the cross-sectional shape of the ball tracks. In principle, in a cross-section through the joint, the local radius of curvature of the ball tracks in the load-transmitting points of contact with the balls is greater than the ball radius. Hereafter, the ratio of the two radii is referred to as conformity factor. By definition, it is always greater than 1 and its numerical value increases with a decreasing osculation, i.e. with a decrease in equality of shape and in the conformity of the two curvatures in the lexical meaning.

The publications listed below describe different shapes of the cross-sections of the outer and inner ball tracks of the joints of the species mentioned.

DE-GM 1 831 827

DE-PS 1 126 199

DE-PS 1 169 727

DE-OS 1 675 240

DE-PS 2 433 349.

Typical track cross-sections are circular-arch-shaped cross-sections wherein the ball of a joint in the unloaded condition is in contact with the track base in one point; cross-sections in the form of a portion of an ellipse wherein the long axis of the ellipse forms the central axis of the track cross-section and wherein the ball of a joint in the unloaded condition establishes contact in two points at a distance from the track base; and the gothic or pointed-arch-shaped cross-section wherein the centers of curvature of the two flanks of the pointed arch are offset relative to the central axis of the track cross section and wherein the ball, with the joint being in the unloaded condition, establishes contact in two points at a distance from the track base. Furthermore, there are known track cross-sections with a flattened track base which, when the joint is in the unloaded condition, generate a three-point contact of the ball in the ball track.

Joints with a circular-arch-shaped track cross-section and one-point contact with the ball are advantageous in that a pressure load can be applied along the entire height of a track flank, i.e. from the track base right up to the track edge. As a result—provided the track conformity is suitably dimensioned—it is possible to achieve the lowest pressure values, i.e. the highest possible service life values. However, this is the case only if the ball is mounted in the ball track in as play-free a way as possible (small radial play relative to the outer part and hub). If this cannot be achieved or if, during operation, the running-in wear (mainly in the cage windows) leads to an increase in play, there is a risk of the occurrence of edge bearing, which can lead to a considerable reduction in service life values. A further disadvantage of the track with a circular-arch-shaped cross-section is the considerable effect which a radial ball/track play has on the rotational play of the joint. Joints with an elliptical track cross-section and a two-point contact with the ball are much more tolerant in respect of rotational play than the previously mentioned joints, although the service life values of said track/ball configuration are regarded as insufficient because only a very small portion of the track is subjected to pressure, so that there therefore have to be generated higher pressure values than in the case of the previously mentioned joints.

In calculations, joints with a circular-arch-shaped track cross-section with one-point contact have better service life values than joints with an elliotical or pointed-arch-shaped track cross-section with two-point contact, one reason being that, in the joints mentioned first, the Hertzian pressure ellipse in the track/ball point of contact is greater than in the joints mentioned in second place. The Hertzian stress values of the track/ball configuration mentioned first are thus lower than those of the track/ball configuration mentioned in second place. However, one disadvantage of joints with a circular-arch-shaped track cross-section consists in that, when high torque values are transmitted, the Hertzian pressure ellipse reaches the track edge, so that excessive loads (stress peaks) can lead to plastic deformation and/or definite damage to the track edge. In particular, this occurs in the outer joint part where the track depth is usually much smaller than in the inner joint part, as a result of which the pressure ellipse reaches the track edges earlier in the outer joint part than in the inner joint part.

Using track cross-section, track, track base, track edge and ball in the singular in the above paragraphs is simpler from the point of view of language and does not contradict the fact that there is provided a plurality of same in each joint.

SUMMARY OF THE INVENTION

It is the object of the present invention to provide bail joints with a track shape wherein, even when subjected to high torque values, the tracks edges are kept largely free from load peaks. A general solution in this respect consists in that at least the ball tracks of one of the joint parts—outer joint part or inner joint part—comprises a track cross-section which remains uniform along the length of same, whose second derivative rises continuously and monotonically from the track base, whose radius of curvature is not constant and which, when the joint is torque-free, permits a contact between the respective ball and the track base within a range of $\leq 5°$ measured from the track base. In another aspect, the outer joint part or inner joint part ball tracks have a track cross-section which is uniform along a length of the ball track and whose radius of curvature axes continuously and monotonically from the track base. A special solution consists in that said ball tracks have a track cross-sections which permits contact between the respective ball and the ball track in the track base, and especially that said ball tracks comprise an elliptical cross-section with a greater axis which is positioned radially relative to the axis of the respective joint part, which elliptical cross-section permits contact between the respective ball and the ball track in the vertex of the ellipse, which vertex is positioned in the track base.

The track cross-section proposed in accordance with the invention with an approximate or even ideal track base contact is able, largely, to combine the advantages of a high pressure load even on the track base with a reduced sensitivity to play. Furthermore, by selecting a specific track shape (i.e. especially the dimensions of an ellipse) track edge bearing can be avoided, even if the balls are subject to large amounts of play in the tracks. A track cross-section in accordance with the invention is compatible with hard machining processes presently used (grinding with a disc, grinding with a pin, milling with a disc, milling with a pin). Each machine which, at present, is used for producing ball tracks should be suitable for the cross-sectional track shape proposed. For measuring the finished tracks, it is common practice in mass production to make the contact angle visible and measure the base play by touching the tracks with a test ball (diameter corresponds to the nominal ball diameter). This measuring method can also be applied to the inventive track/ball configuration, the only difference being that the test ball to be used for this purpose should have a slightly greater diameter than the ball subsequently used in the joint.

A play-free assembly should be given preference. This car be achieved by observing correspondingly close production tolerances or by classifying the components.

The conformity factor of the ball tracks with an elliptical cross-section should have standard values and, in particular, it should be below 1.02 in the region of the track base. The ellipse ratio of the elliptical tracks should range between 1.004 and 1.02. If the tracks in only one of the joint parts, either in the outer joint part or in the inner joint part—are designed in accordance with the invention, the outer joint part should be given preference.

The effect of the invention is that, with low torque values, the contact angle between the ball and the inventive ball track initially increases in the usual way, i.e. the contact point wanders from the track base up the track flank, with the counter forces in the respective other ball track being formed by a contact with a track flank. The ball is centered between diagonally opposed flanks of the outer ball tracks and of the inner ball track. However, due to the fact that the conformity factor of the inventive ball track rises from the track base to the track edge, a further increase in torque only negligibly results in a change in the contact angle; it is essentially only the depth of the pressure distributing ellipse under the Hertzian pressure ellipse which increases. On the other hand, a further movement of the Hertzian pressure ellipse towards the track edges is largely prevented and in consequence and in particular, a further rise of the ball at the flanks of the inventive ball track is also largely prevented. The effective contact angle at the inventive ball track is thus quasi forced on to the other ball tracks in the form of a contact angle of the same size.

BRIEF DESCRIPTION OF THE DRAWINGS

Below, the invention will be explained in greater detail with reference to the drawings which show various embodiments.

FIG. 8 is a cross-sectional view of a first ball track in an outer joint part with a ball contained therein,
 a) according to the state of the art with a round track cross-section,
 b) according to the state of the art with an elliptical track cross-section,
 c) in accordance with the invention with an elliptical track cross-section.

FIG. 9 is a cross-sectional view of a second ball track in an inner joint part with the ball contained therein,
 a) according to the state of the art with a round track cross-section,
 b) according to the state of the art with an elliptical track cross-section,
 c) in accordance with the invention with an elliptical track cross-section.

FIG. 10
 a) the illustration according to FIG. 8c in an enlarged scale,
 b) the illustration according to FIG. 9c in an enlarged scale.

DETAILED DESCRIPTION OF THE INVENTION

Figure 1:
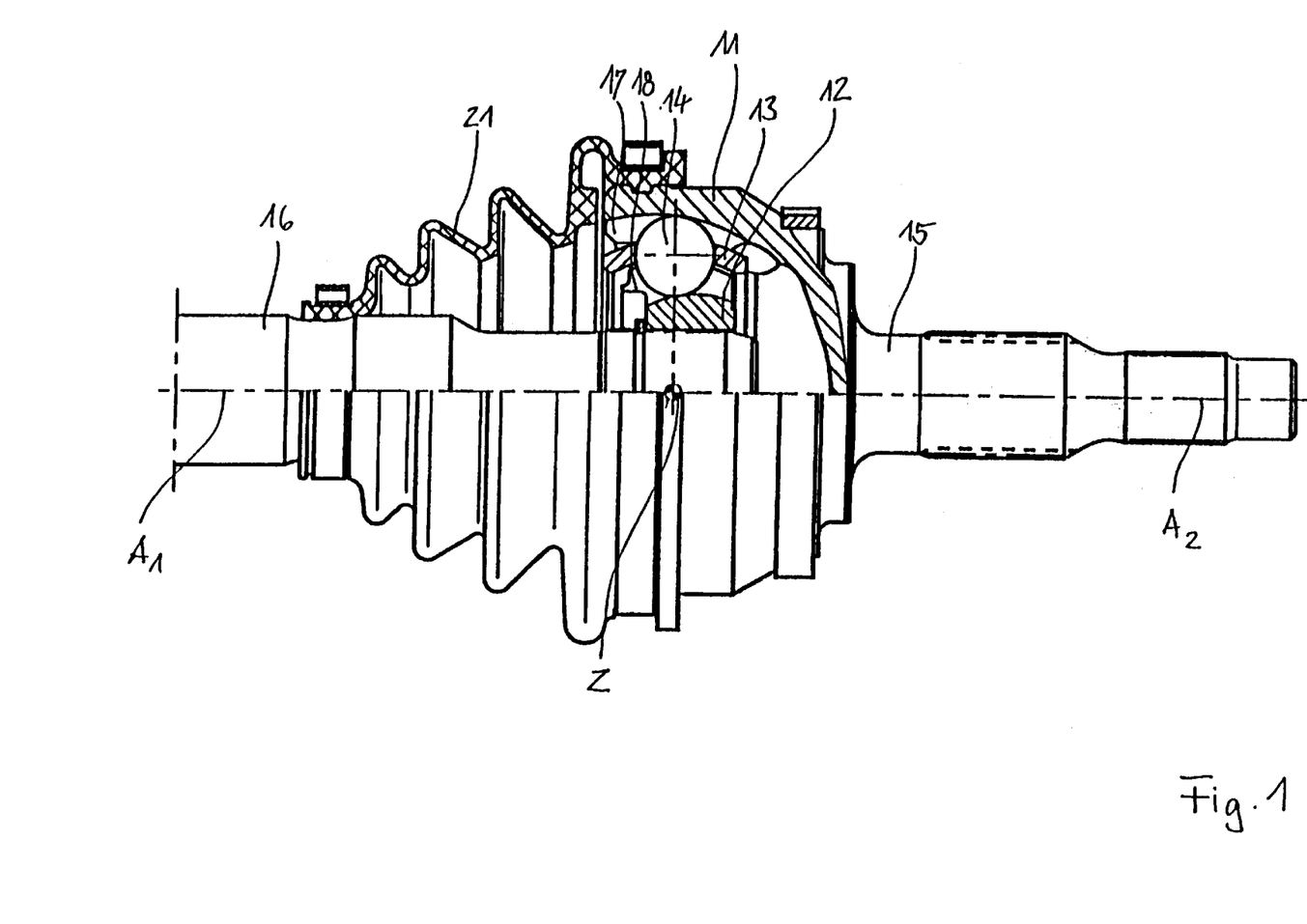
FIG. 1 shows half a longitudinal section of a Rzeppa fixed joint (RF joint) to which the invention can be applied.

FIG. 1 shows a RF joint which, in a half-section, shows he outer joint part 11, the inner joint part or ball hub 12, the ball cage 13 and a torque transmitting ball 14. The outer joint part 11 is integrally connected to a shaft journal 15. Into the inner joint part 12 there is inserted a plug-in shaft 16. A convoluted boot 21 seals the joint and is secured on the outer joint part 11 and on the plug-in shaft 16. It can be seen that an outer ball track 17 is provided in the outer joint part 11 and an inner ball track 18 is provided in the inner joint part 12 and associated with the outer ball track 17. Both ball tracks 17, 18 are curved in such a way that they are circular-arch-shaped, with the centers of curvature being offset relative to one another in the direction of the axes $A_1$, $A_2$ of the joint parts. As a result of the offset curvatures of the curved ball tracks 17, 18, the balls 14 and thus the ball cage 13 are guided on to the angle-bisectng plane when the longitudinal axes $A_1$ and $A_2$ are articulated around the joint center Z.

Figure 2:
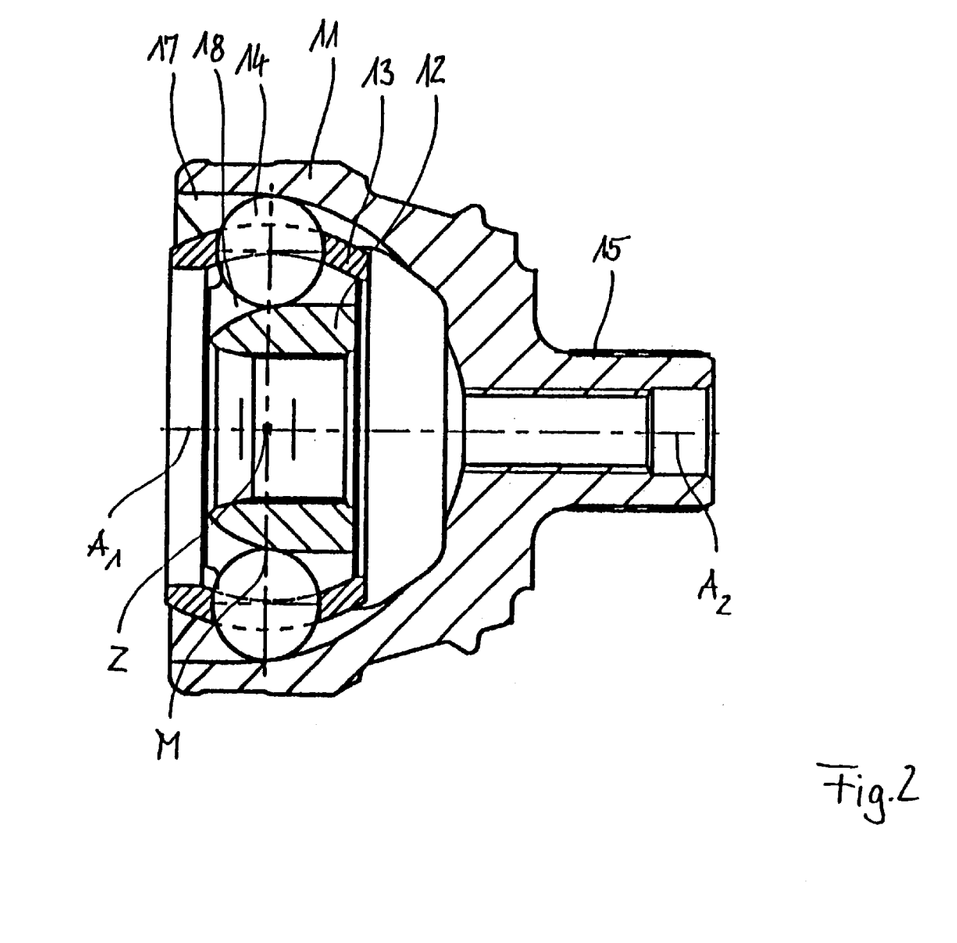
FIG. 2 is a longitudinal section of an undercut-free joint (UF joint) to which the invention can be applied.

FIG. 2 illustrates a UF joint which shows the outer joint part 11, the inner joint part or ball hub 12, the ball cage 13 and torque transmitting balls 14. The outer joint part is integrally connected to a shaft journal 15. The inner joint part 12 has an inner aperture for inseing a plug-in shaft (not illustrated). In the outer joint part 11 there are shown outer ball tracks 17 and in the inner joint part 12 inner ball tracks 18 associated with said outer ball tracks 17. In a partial region of their axial extension, both ball tracks 17, 18 are curved in a circular-arch-shaped way. The curved portions are followed by approximately axis-parallel, straight track portions on opposed sides relative to the central plane M. The centers of curvature of the curved portions are offset relative to one another in the direction of the axes $A_1$, $A_2$ of the joint parts. As a result of the offset curvatures, the balls 14 are controlled around the joint center Z by the tracks 17, 18 on to the angle-bisecting plane when the axes $A_1$, $A_2$ are articulated relative to one another.

Figure 3:
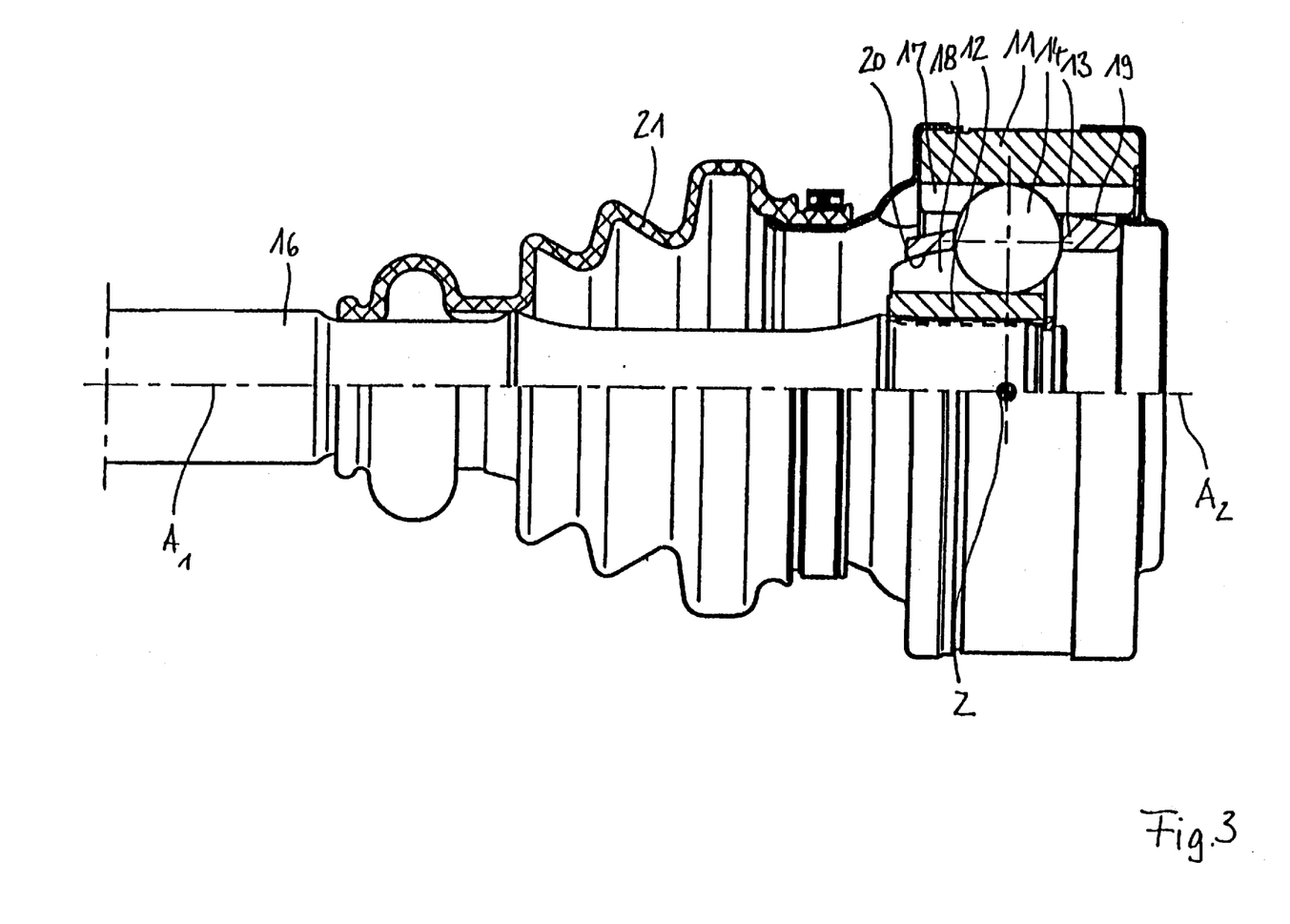
FIG. 3 is half a longitudinal section of a double offset plunging joint (DO joint) to which the invention can be applied.

FIG. 3 illustrates a DO joint, which shows an outer joint part 11, an inner joint part or ball hub 12, a ball cage 13 and a torque transmitting bail 14. The outer joint part 11 can be connected to a flange. A plug-in shaft 16 is inserted into the inner joint part 12. A convoluted boot 21 seals the joint and is connected to the outer joint part 11 and to the plug-in shaft 16. It can be seen that in the outer joint part there is provided an outer ball track 17 which extends in an axis-parallel way and in a straight line. In the inner joint part 12, there is shown a ball track 18 which also extends in a straight line and in an axis-parallel way. The cage 13 comprises an outer spherical surface 19 which is guided in a cylindrical inner aperture of the outer part 11, as well as an inner spherical surface 20 which is guided on a correspondingly spherical outer face of the inner joint part 12. The centers of the two above-mentioned spherical surfaces 19, 20 are offset in the direction of the axes $A_1$, $A_2$ of the joint parts. As a result of the offset of the spherical surfaces, the cage 13 and thus the balls 14 are guided on to the angle-bisecting plane between the axes $A_1$, $A_2$ when the axes $A_1$, $A_2$ are articulated around the joint center Z.

Figure 4:
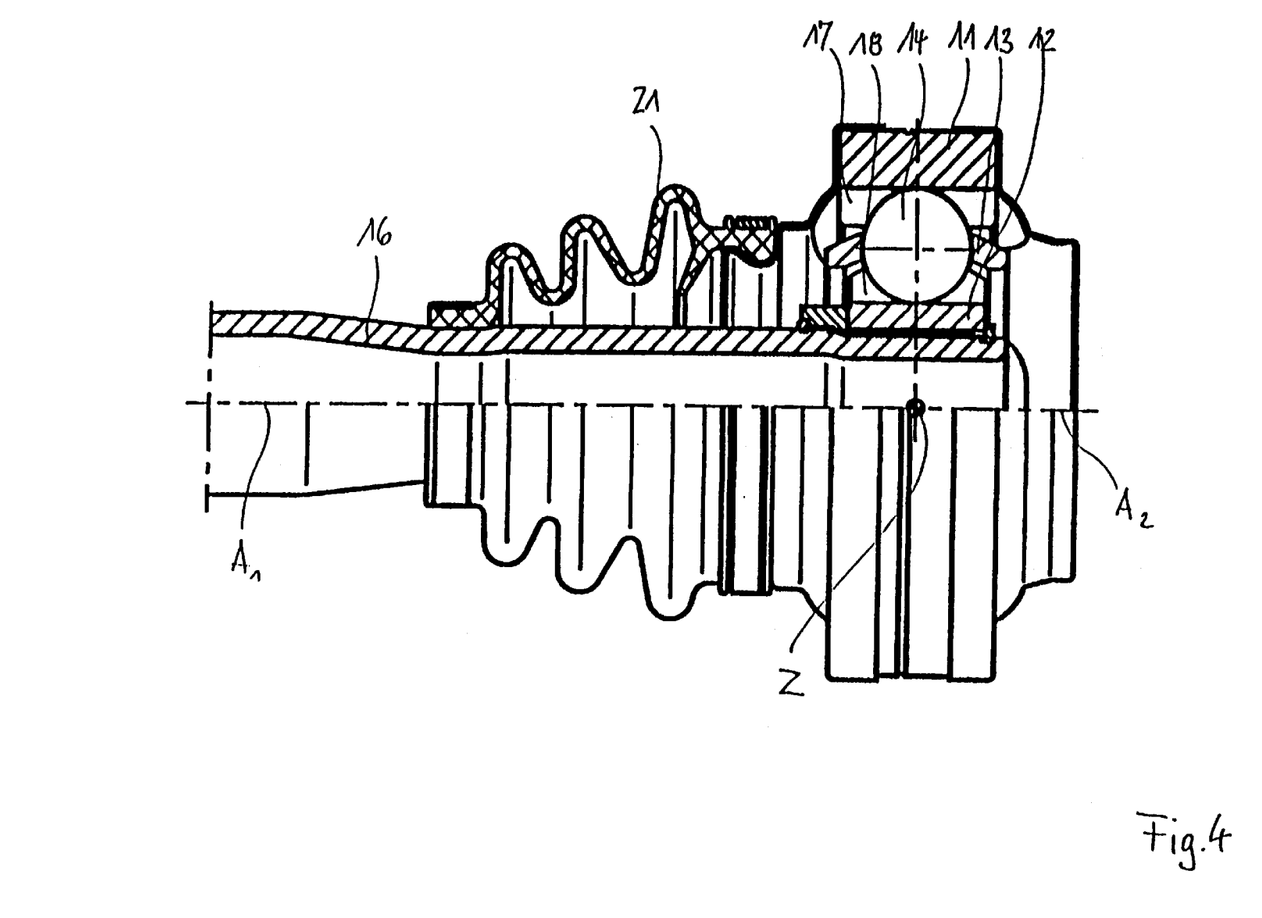
FIG. 4 is half a longitudinal section through a plunging joint with intersecting tracks (VL joint) to which the invention can be applied.

FIG. 4 shows a VL joint comprising an outer joint part 11, an inner joint part and ball hub 12, a ball cage 13 and a torque transmitting ball 14. The outer joint part can be connected to a flange. A hollow plug-in shaft 16 is inserted into the inner joint part 12. A convoluted boot 21 seals the joint and is connected to the outer joint part 11 and to the plug-in shaft 16. In the outer joint part 11 there can be seen an outer ball track 17 which extends at an unrecognizable angle of intersection relative to the longitudinal axis $A_1$ of the outer joint part 11. In the inner joint part 12 there can be seen a ball track 18 which also extends at an angle of intersection relative to the longitudinal axis $A_2$ of the inner joint part. The two angles of intersection are of identical size, but are orientated in opposite directions relative to the longitudinal axes. The cage 13 comprises an outer spherical surface 19 which is guided in a cylindrical inner aperture of the outer joint part 11, as well as an inner spherical surface 20 which is provided at a distance from the outer face of the inner joint part. Because of the opposed angles of intersection of the ball tracks, the balls and thus the cage are guided on to the angle-bisecting plane between the axes $A_1$, $A_2$ when the axes $A_1$, $A_2$ are articulated around the joint center Z. The ball track cross-sectons which are significant as regards the load on the ball tracks during the transmission of torque, cannot be seen in the above-described Figures. Examples of their shapes which can be applied to all the above-mentioned joint types will be given in the following Figures.

Figure 5:
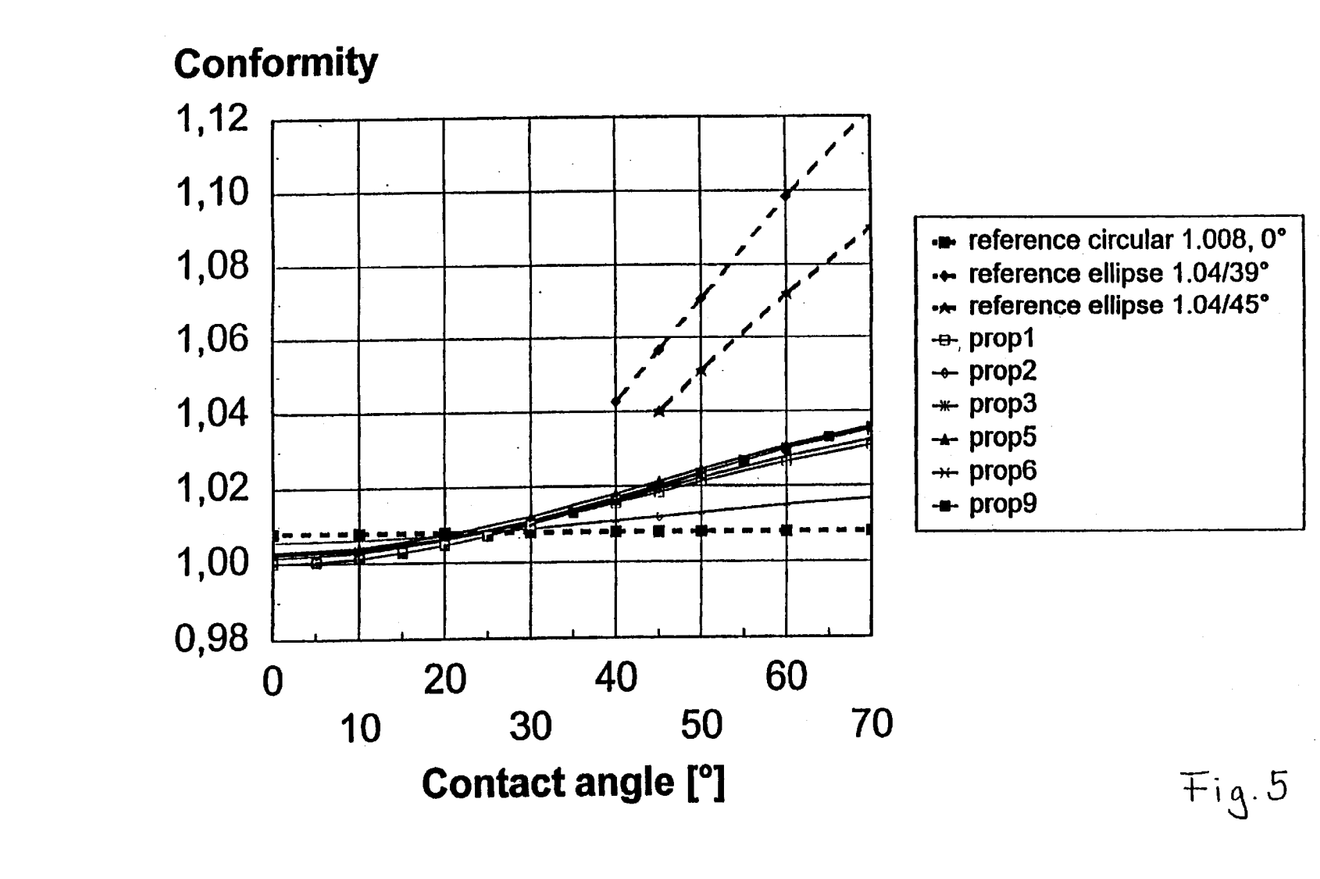
FIG. 5 shows a diagram entitled "conformity factor as a function of the contact angle" for inventive track cross-sections (half-sections) as compared to three track cross-sections (half-section) according to the state of the art.

FIG. 5 shows conformity curves prop1 . . . prop9 of different elliptical track shapes with track base contact in the sense of the invention. There are obtained conformity curves which, in the lower track region, comprise a conformity factor ranging between 1 and 1.01, whereas in the region of the track edge, they comprise a conformity factor of up to approx. 1.035. In addition, there are shown the conformity curves for three reference geometries:

1) A circular-arch-shaped track cross-section with a conformity factor of 1.008 for one-point contact (corresponds to a RF-C-joint).
2) An elliptical track with a 45° contact angle and a conformity factor of 1.04 for two-point contact at the track flanks.
3) An elliptical track with a 39° contact angle and a conformity factor of 1.04 for two-point contact at the track flanks.

Figure 6:
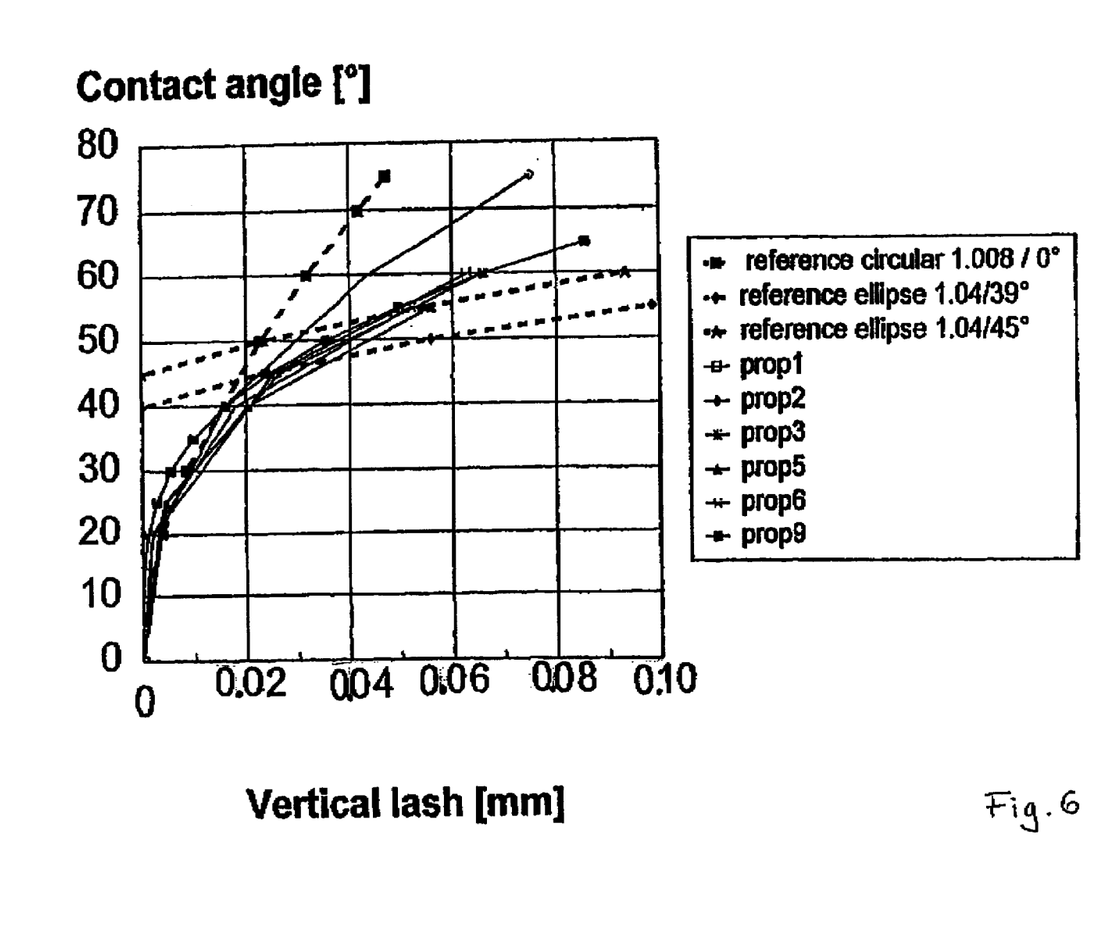
FIG. 6 is a diagram "Vertical lash as a function of the contact angle" for inventive track cross-sections (half-sections) as compared to three track cross-sections (half-sections) according to the state of the art.

FIG. 6 shows the susceptibility of the contact angle to vertical play. As is already known, any play in a circular-arch-shaped track cross-section leads to a considerably greater increase in the contact angle than in elliptical tracks, which can lead to the risk of edge damage. In the range of low play values (because of the low conformity factor in the track base), the tracks in accordance with the invention have a characteristic which is similar to that of the circular-arch-shaped track cross-section, but with increasing play values, they become advantageously more similar to the elliptical track.

Figure 7:
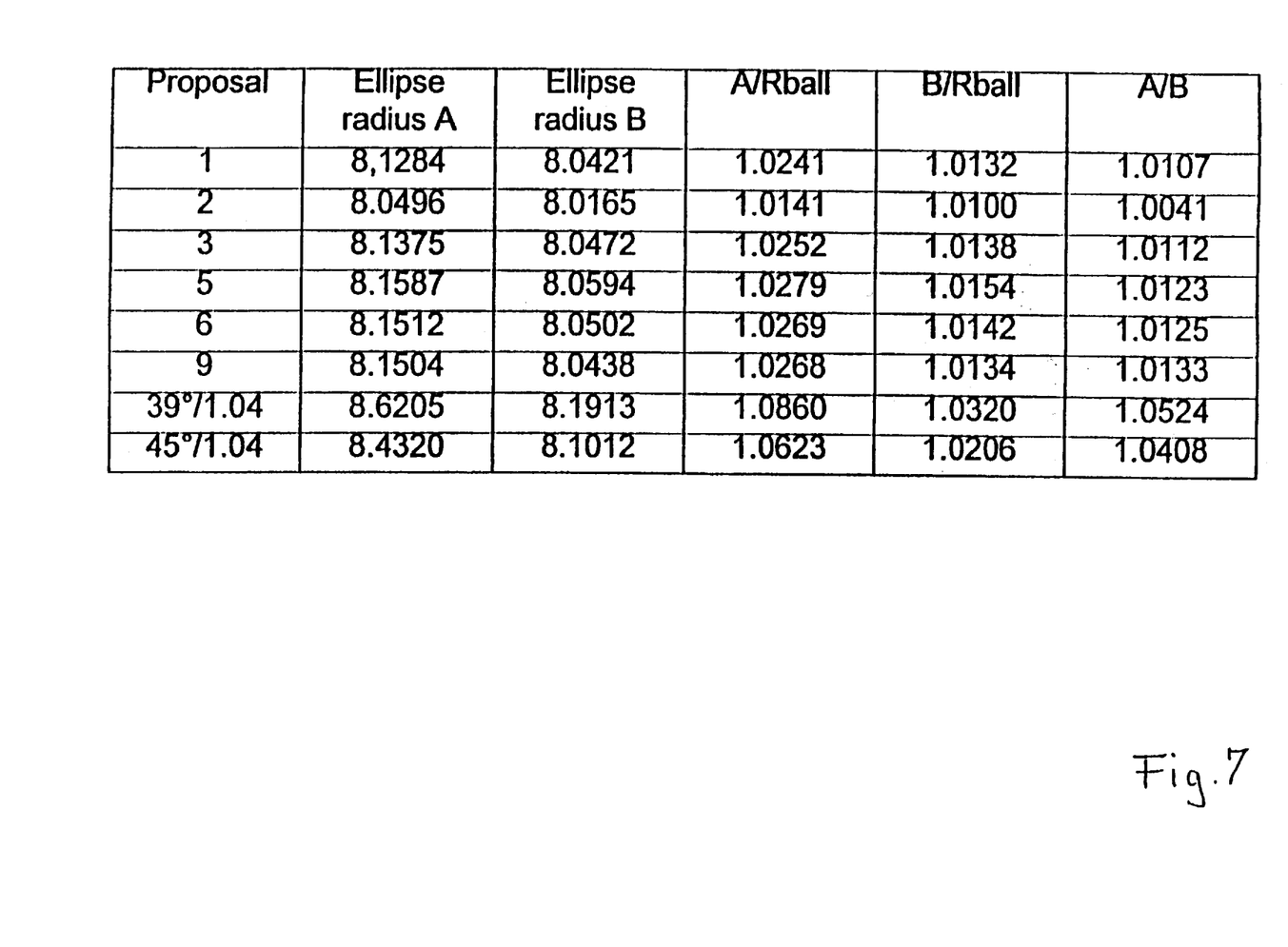
FIG. 7 is a table containing characteristic values for six inventive track cross-sectional shapes as compared to two track cross-sections in accordance with the state of the art.

FIG. 7, in particular, shows the conformity factors and the dimensions of the ellipses of the above-mentioned tracks.

Figure 8A:
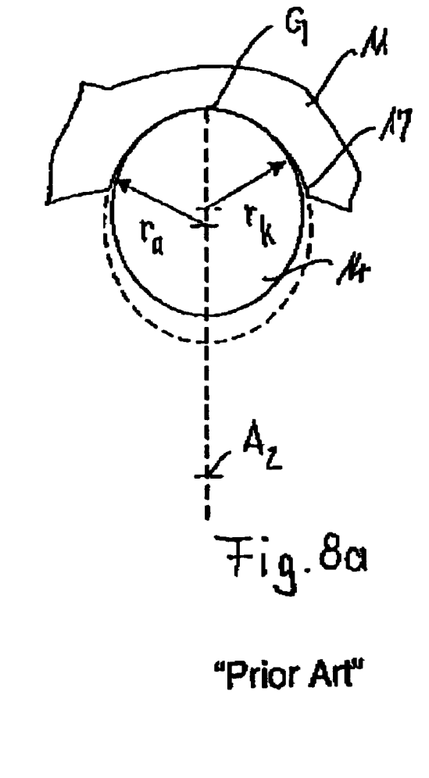

FIG. 8a shows part of an outer joint part 11 with an outer track 17 and with its central axis $A_2$. A ball 14 is accommodated in the outer track 17. The cross-section of the track 17 is characterised by the radius $r_a$, whereas the radius of the ball has been given the reference symbol $r_k$. The ball 14 is in contact with the track base G only.

Figure 8B:
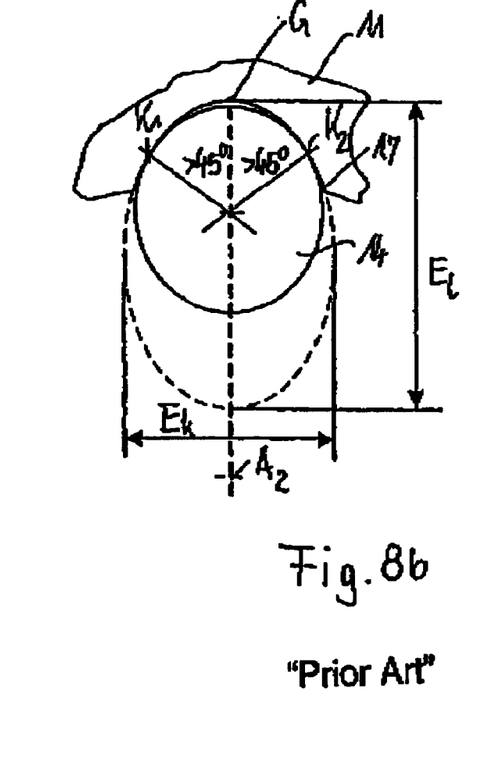

FIG. 8b shows part of an outer joint part 11 with an outer track 17 and with its axis $A_2$, with a ball 14 being accommodated in the outer track 17. The cross-section of the track 17 is described by an ellipse with a short axis $E_k$ and a long axis $E_l$. The ball 14 is in contact with the track 17 in the contact points $K_1$, $K_2$ which, with reference to the track base G, are each positioned at a center angle of >45° relative to the long axis of the ellipse.

Figure 8C:
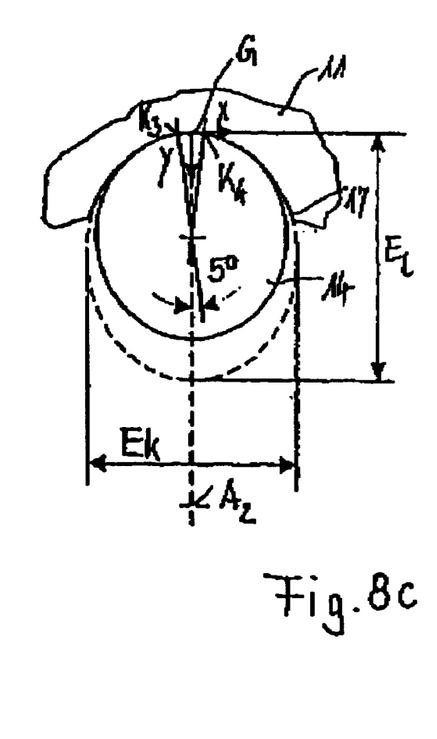

FIG. 8c is a cross-section view of part of an outer joint part 11 with an inventive outer track 17 and with its axis $A_2$, with a ball 14 being accommodated in said outer track 17. The cross section of the track 17 is described by an ellipse with a short axis $E_k$ and a long axis $E_l$. The track base G is the origin of the system of co-ordinates x and y to which the inventive description of a continuously and monotonically rising track shape refers. The reference symbols $K_3$ and $K_4$ describe the end points of a region of the contact of the ball 14 with the track 17, which region of contact extends from the long axis towards both sides respectively at a center angle of 5°.

Figure 9A:
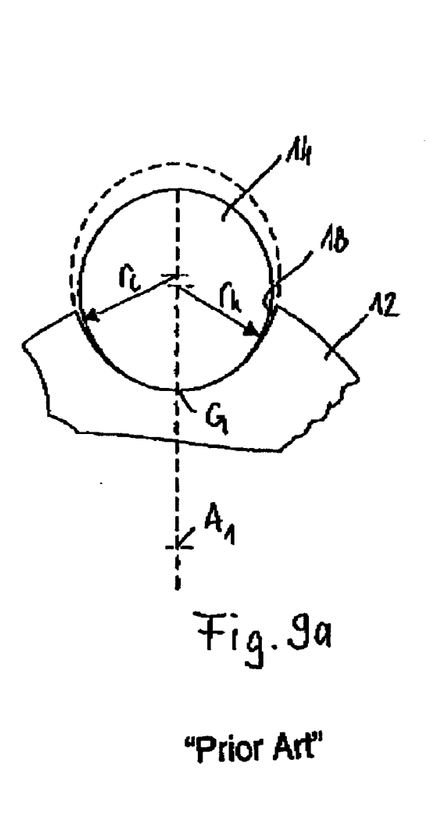

FIG. 9a shows part of an inner joint part 12 with an inner track 18 and with its longitudinal axis $A_1$. A ball 14 is accommodated in the, inner track 18. The cross-section of the track is characterised by the radius $r_k$, whereas the radius of the ball has been given the reference symbol $r_k$. The ball 14 is in contact with the track base G only.

Figure 9B:
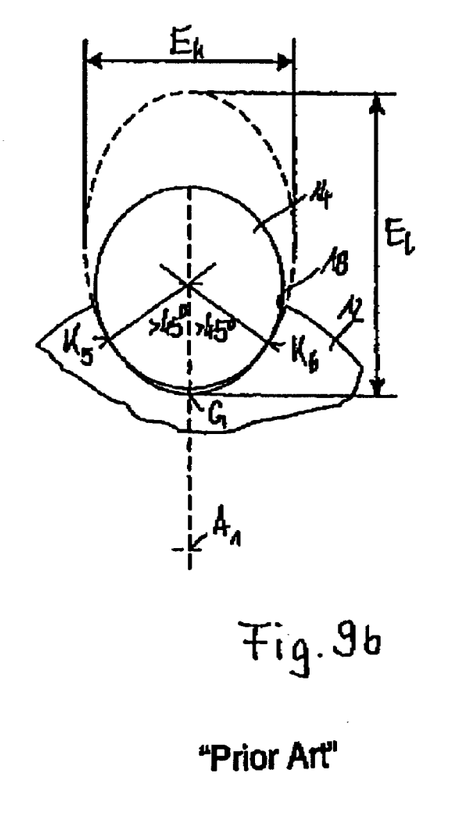

FIG. 9b shows part of an inner joint part 12 with an inner track 18 and with its axis $A_1$, with a ball 14 being accommodated in the inner track 18. The cross on of the track is described by an ellipse with a short axis $E_k$ and a long axis $E_l$. The ball 14 is in contact with the track 18 in the contact points $K_5$, $K_6$ which, with reference to the track base G, are each positioned at a center angle of >45° relative to the long axis of the ellipse.

Figure 9C:
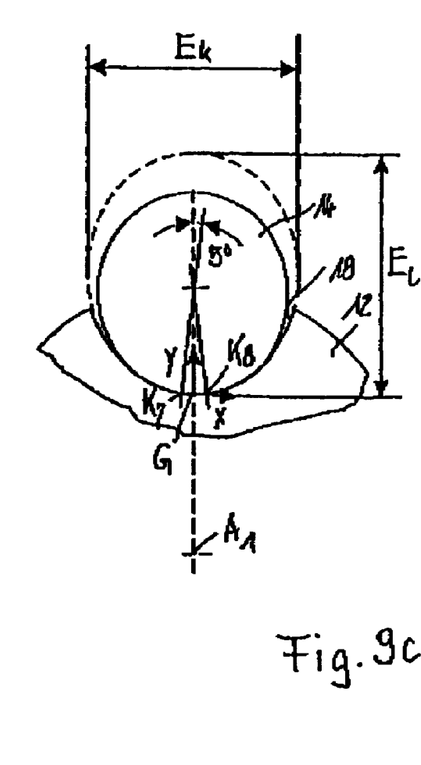

FIG. 9c is a cross-sectional view of part of an inner joint part 12 with an inventive inner track 18 and with its longitudinal axis $A_1$, with a ball 14 being accommodated in said inner track 18. The cross-sections of the track is described by an ellipse with a short axis $E_k$ and a long axis $E_l$. The track base G is the origin of the system of coordinates x and y to which the inventive description of a continuously and monotonically rising track shape refers. The reference symbols $K_7$ and $K_8$ describe the end points of a region of the contact of the ball 14 with the track 18, which region of contact extends from the long axis towards both sides respectively at a center angle of 5°.

Figure 10A:
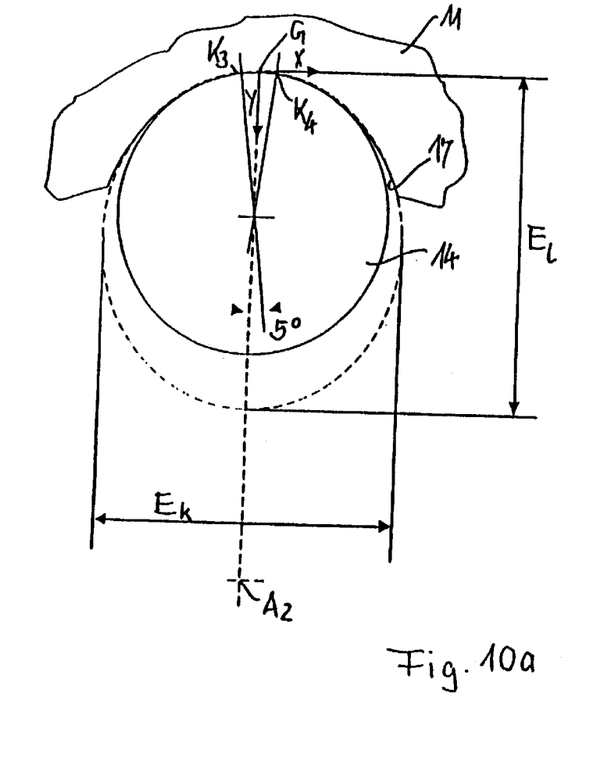

As far as FIG. 10a is concerned, reference is made to the identical FIG. 8c.

Figure 10B:
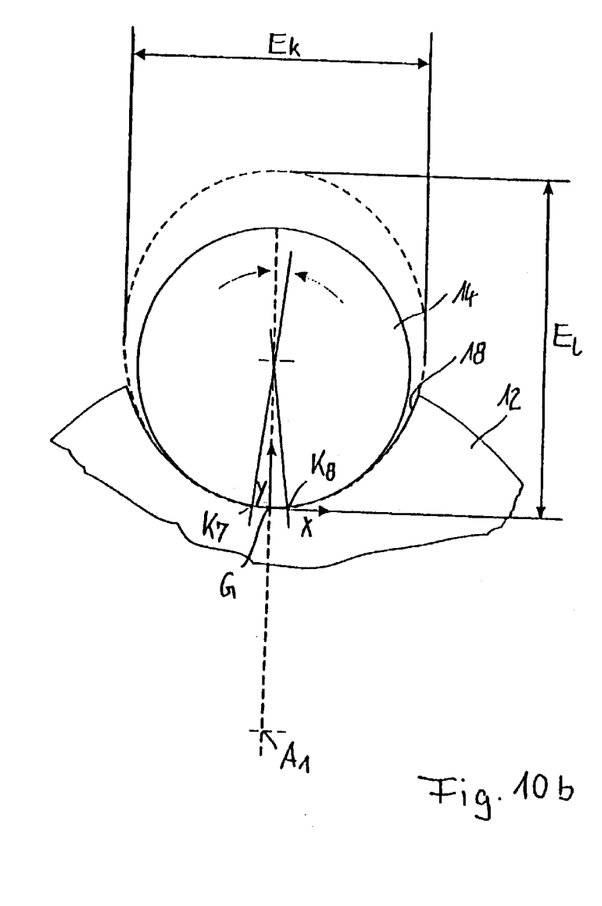

As far as FIG. 10b is concerned, reference is made to the identical FIG. 9c.

What is claimed is:

1. A constant velocity universal ball joint comprising:
    an outer joint part having a first axis and comprising an inner aperture in which there are provided substantially longitudinally extending first ball tracks;
    an inner joint part having a second axis and forming a ball hub positioned in the inner aperture of the outer joint part and being provided with substantially longitudinally extending second ball tracks;
    torque transmitting balls guided in pairs of said first and second ball tracks; and
    an annular ball cage arranged between the outer joint part and inner joint part and comprising circumferentially distributed ball windows in which the individual balls are held in a common plane and guided on to an angle-bisecting plane between the first axis and the second axis,
    wherein the first or second ball tracks comprise a track cross section which is uniform along a length of the ball track and whose radius of curvature rises continuously and monotonically from a track base, the cross-section having a non-constant radius of curvature and which, when the joint is torque-free, permits a contact between the respective ball and the track base within a range of less than or equal to 5° measured from the track base.

2. A joint according to claim 1, wherein said first or second ball tracks have a track cross-section which permits contact between the respective ball and the ball track in the track base.

3. A joint according to claim 2, wherein said first or second ball tracks comprise an elliptical cross section with a greater axis which is positioned radially relative to the axis of the respective joint part, which elliptical cross-section permits contact between the respective ball and the ball track in a vertex of the ellipse, which vertex is positioned in the track base.

4. A joint according to claim 3, wherein a ratio of the ellipse axes is 1.004 to 1.02.

5. A joint according to claim 1 wherein a conformity factor in a vertex of the track cross-section is less than or equal to 1.02 in the unloaded condition.

6. A joint according to claim 1 wherein the first and second ball tracks comprise a track cross-section which is uniform along a length of the ball track and whose radius of curvature rises continuously and monotonically from a track base, the cross-section having a non-constant radius of curvature and, when the joint is torque-free, permitting a contact between the respective ball and the track base within a range of less than or equal to 5° measured from the track base.

7. A joint according to claim 1 wherein the other of the first or second ball tracks have a circular-arch-shaped cross-section.

8. A joint according to claim 1 wherein the other of the first or second ball tracks have a cross-section comprising a gothic arch defined by two circular arches with offset centers with intersecting radii.

9. A joint according to claim 1 wherein the other of the first or second ball tracks comprises a narrow elliptical cross-section with a greater axis which is positioned radially relative to the respective axis of the corresponding joint part, in which elliptical cross-section the balls have a two-point contact at a distance from the track base and vertex respectively.

10. A joint according to claim 1 wherein the joint is a Rzeppa fixed joint.

11. A joint according to claim 1 wherein the joint is an undercut-free fixed joint.

12. A joint according to claim 1 wherein the joint is a double offset plunging joint or a cross-groove plunging joint.

13. A constant velocity universal ball joint comprising:
    an outer joint part having first ball tracks;
    an inner joint part positioned within the outer joint part and having second ball tracks;
    a plurality of balls, each of which is guided in pairs of said first and second ball tracks; and
    a ball cage arranged between the outer and inner joint part and comprising a plurality of cage windows for receiving each of said plurality of balls,
    wherein the first or second ball tracks have a uniform cross-section along their length, the cross-section having a substantially elliptical radius of curvature with a greater axis positioned radially relative to an axis of the respective joint part, the cross-section, when the joint is torque free, permitting contact between the respective ball and a base of the ball track within a range of less than or equal to 5° measured from the track base.

14. A joint according to claim 13, wherein a ratio of the ellipse axes is 1.004 to 1.02.

15. A joint according to claim 14, wherein a conformity factor in a vertex of the track cross-section is less than or equal to 1.02 in the unloaded condition.

16. A joint according to claim 13, wherein the other of the first or second ball tracks have a circular-arch-shaped cross-section.

17. A joint according to claim 13, wherein the other of the first or second ball tracks have a cross-section comprising a gothic arch defined by two circular arches with offset centers with intersecting radii.

18. A joint according to claim 13, wherein the other of the first or second ball tracks comprise a narrow elliptical cross-sections with a greater axis which is positioned radially relative to the respective axis of the corresponding joint part, in which elliptical cross-section the balls have a two-point contact at a distance from the track base and vertex respectively.

19. A joint according to claim 13 wherein the joint is a Rzeppa fixed joint or undercut-free fixed joint.

20. A joint according to claim 13 wherein the joint is a double-offset plunging joint or a cross-groove plunging joint.

* * * * *